Aug. 5, 1941.    W. L. JONES    2,251,843
SPRING SHACKLE
Filed March 6, 1941
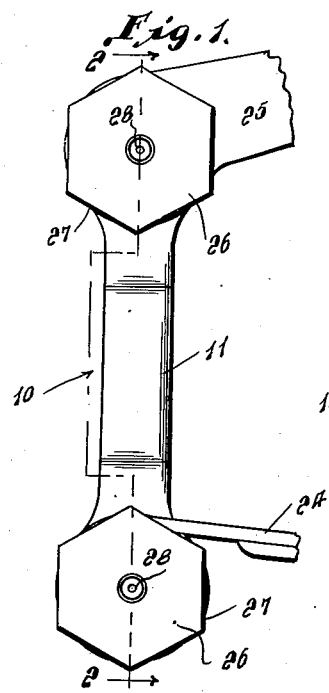
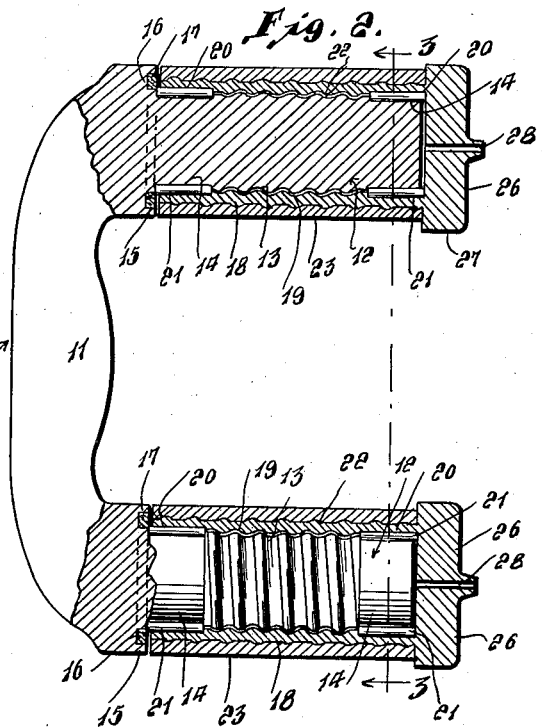
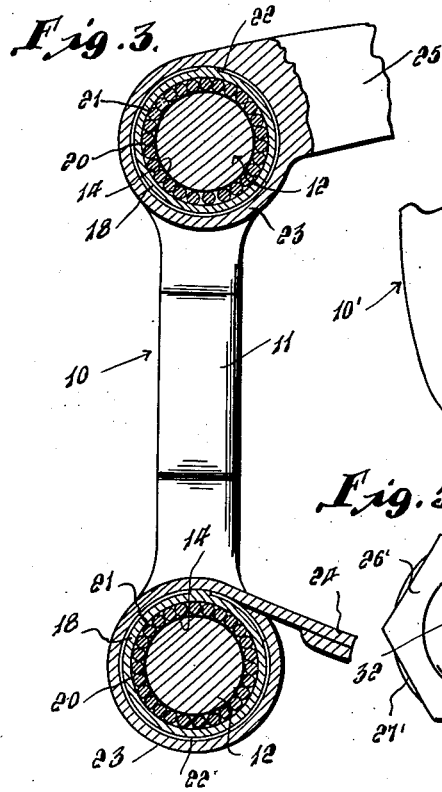
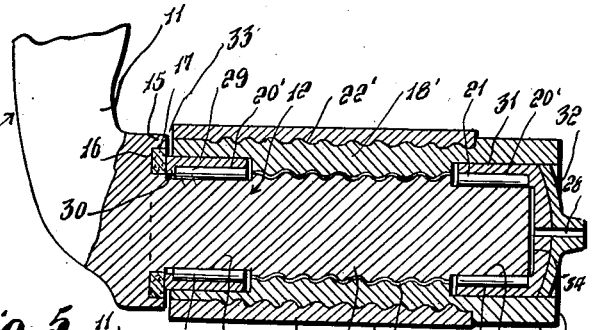
Inventor
William L. Jones
By L. F. Randolph
Attorney Patented Aug. 5, 1941

2,251,843

UNITED STATES PATENT OFFICE 2,251,843

SPRING SHACKLE

William L. Jones, Centralia, Ill., assignor of fifty-one per cent to Glenn W. Johnson, Centralia, Ill.

Application March 6, 1941, Serial No. 382,059

7 Claims. (Cl. 267—54)

This invention relates to an improved construction of shackle for leaf type vehicle springs.

More particularly, it is an aim of the invention to provide a U-shaped shackle having improved means for pivotally mounting complementary ends of a pair of vehicle springs thereon or for connecting an end of a vehicle spring to the frame of a vehicle to be supported thereby in such a manner that said spring end pivots relatively to the shackle and through the shackle connection swings relatively to the vehicle frame.

More particularly, it is an aim of the invention to provide an improved U-type needle bearing spring shackle so constructed and arranged that the weight of the vehicle will be carried by sets of needle bearings and which will not be subject to the so called "freezing" or drying up and sticking of the bushing to the shackle as frequently occurs with spring shackles of the type now generally used.

Other objects and advantages of the invention will hereinafter become more fully apparent from the following description of the drawing, which illustrates preferred embodiments of the invention, and wherein—

Figure 1 is a front elevational view showing the shackle assembled and in an applied position, Figure 2 is a vertical sectional view of the same taken substantially along the plane of the line 2—2 of Figure 1 and showing a portion of the shackle in elevation.

Figure 3 is an enlarged transverse sectional view taken substantially along the plane of the line 3—3 of Figure 2, Figure 4 is a fragmentary view similar to Figure 2 and showing one end of a modified construction of spring shackle, and Figure 5 is an end view in elevation of a portion of the modified spring shackle.

Referring more particularly to the drawing, wherein like reference characters designate like or corresponding parts throughout the different views, 10 designates generally one embodiment of the spring shackle in its entirety, and which is illustrated in Figures 1 to 3. The spring shackle 10 comprises a U-shaped supporting member 11 which is forged in one piece and which is provided with corresponding restricted ends forming spaced, substantially parallel spindles 12 which are provided with threaded intermediate portions 13. The ends of the spindles 12 form inner races 14. The U-shaped supporting member 11 is provided with annular shoulders 15 at the inner ends of the spindles 12 which are provided with outwardly opening annular grooves 16 for receiving yieldable packing rings or gaskets 17.

A bushing 18 is provided with an internally threaded intermediate portion 19. A bushing 18 is mounted on each of the spindles 12 with the threaded portion 19 of each bushing loosely engaging the threaded portion 13 of a spindle 12. Each bushing 18 is provided with end portions forming outer races 20. A set of needle bearings or ball bearings 21 is disposed between each of the complementary inner and outer races 14 and 20 to provide anti-friction means for supporting each of the bushings 18 on a spindle 12.

The bushings 18 are each externally threaded as at 22 for engaging the internally threaded eye 23 of an end of a leaf spring, as indicated at 24, or of an internally threaded eye 23 which is formed in a portion 25 of the vehicle frame. It is to be understood, that the shackle 10 may be used for either connecting complementary ends of a pair of leaf springs or for connecting an end of a leaf spring to the vehicle frame.

Bushing 18, at its outer end, is provided with an enlarged head 26 which forms an abutment for the outer end of the eye 23 which is mounted thereon and which is provided with wrench lands 27 for screwing the bushing 18 onto a spindle 12 and into an eye 23. The bushing heads 26 are each provided with a lubricating port 28 for lubricating the bearings 21 and which are provided with conventional plugs or "Zerk" fittings, not shown. However, if desired, the lubricating ports 28 may be omitted.

To assemble the shackle 10, a set of the bearings 21, packed in grease, are mounted on the inner races 14 at the inner ends of the spindles 12, and a set of bearings 21, packed in grease, are mounted in the outer races 20 at the outer ends of the bushings 18. The eyes 23 are then applied to the spindles 12 after which the bushings 18 are each screwed simultaneously into an eye 23 and onto a spindle 12, disposed within said eye for completing the assembly. The threads 19 and 22 are of the same pitch so that the bushings 18 can be simultaneously screwed into the eyes 23 and onto the spindles 12. As seen in Figure 2, the external threads of the bushings snugly engage the threads of the eyes and the internal threads of the bushings loosely engage the threads of the spindles so that the bushings and eyes will be supported on the spindles by the bearings 21 to prevent the bushings from "freezing" or sticking to the spindles. Consequently, when the eyes 23 pivot on the spindles 12 there will be no relative movement between the bushings and eyes but instead the bushings will turn on the bearings 21 relatively to the spindles. To allow for this pivotal movement, the inner ends of the eyes 23, as seen at 29, are spaced slightly from the shoulders 15 and the inner ends of the bushings 18 abut against the washers or gaskets 17 which will yield sufficiently to allow the bushings to move inwardly slightly relatively to the shoulders 15 and yet at all times remain in contact with the packing elements 17 to prevent dirt or other foreign matter or moisture reaching the bearings 21.

In Figures 4 and 5, a slightly modified form of the invention is disclosed comprising a shackle construction designated generally 10' and including a U-shaped member, corresponding to the member 11 and having the parts 11 to 17, inclusive, corresponding to the parts bearing the same reference characters in the embodiment of the invention shown in Figures 1 to 3. The shackle construction 10' has a modified bushing 18' which is open at both ends. The bushing 18' is provided, intermediate of its ends, with the internally disposed threads 19' for engaging the threads 13 and is provided with external threads 22' of the same pitch as the threads 19' for snugly engaging the internally threaded spring or frame eye 23. The bushing 18' is provided with an enlarged outer end 26' forming an abutment for the outer end of the eye 23 and which is provided with wrench lands 27' to permit a wrench to be used for screwing the bushing 18' into the eye 23 and onto the spindle 12. A race member 29 is disposed around the inner set of bearings 21 and within the inner end 20' of the bushing 18'. The outer race member 29 is provided with an inwardly projecting annular flange 30 at its inner end which bears against the packing 17 for sealing the bearings 21 from dirt and moisture. A cup shaped outer race member 31 is mounted in the outer end 20' of the bushing 18' and is disposed over the outer set of bearings 21 and around the outer end of the spindle 12. A cap 32 is driven or pressed into the outer end of the bushing 18' for retaining the race member 31 in place. Cap 32 and the race member 31 are provided with alined ports 28' for lubricating the bearings 21.

The shackle construction 10' is assembled by first applying the inner set of bearings 21 and the race member 29 and then simultaneously screwing the bushing 18' into the eye 23 and onto the spindle 12, after which the outer set of bearings 21 and the outer race 31 are applied and then secured by the cap 32.

As in the shackle construction 10, the bushing 18' is threaded loosely on the spindle 12 to be thereby supported by the bearings 21 and the bushing 18' and eye 23 are spaced from the shoulder 15, as seen in Figure 4, at 33, to permit said parts to move inwardly of the spindle 12 and a space 34 is also provided between the spindle 12 and the outer end of the race 31 so that the bushing 18' and eye 23 can be moved inwardly of the spindle 12 in pivoting in one direction and the parts are obviously free to move outwardly when pivoting and moving in the other direction.

Various other modifications and changes in the invention are contemplated and may obviously be resorted to as only preferred embodiments thereof have been disclosed.

I claim as my invention:

1. A spring shackle comprising a U-shaped member having corresponding, restricted substantially parallel legs, the intermediate portions of said legs being threaded, the end portions of said legs forming inner races, bushings for engaging said legs, each of said bushings being internally threaded intermediate of its ends for loosely engaging a threaded portion of a leg of said U-shaped member, sets of roller bearings disposed between said inner races and the ends of each of said bushings to provide anti-friction means for supporting the bushings on said legs of the U-shaped member, and each of said bushings being externally threaded for engaging the internally threaded eye formed on the end of a leaf spring for pivotally mounting said eyes on said ends of the U-shaped shackle.

2. A shackle construction as in claim 1, the extremities of said bushines forming outer races for said sets of roller bearings.

3. A shackle construction as in claim 1, comprising outer race members disposed in the ends of the bushings and in which said sets of roller bearings are disposed.

4. A shackle construction as in claim 1, said shackle being provided with an annular shoulder at the inner end of each of its restricted legs, each of said annular shoulders being provided with an annular outwardly opening groove, and an annular gasket disposed in each of said grooves, each of said annular gaskets being arranged to engage the inner end of one of the bushings for sealing the space therebetween.

5. A spring shackle comprising a shackle having spaced, substantially parallel spindles, each of said spindles having an intermediate threaded portion and end portions forming inner races, a bushing having an internally threaded intermediate portion for loosely engaging the threaded portion of the spindle, each of the spindles being provided with a bushing, each of said bushings being adapted to releasably engage in an eye formed on the end of a spring, and sets of needle bearings disposed around said inner races and within the ends of the bushings for rotatably supporting the bushings on said spindles for pivotally mounting said spring ends on the shackle.

6. A construction as in claim 5, comprising outer races disposed in the ends of the bushings and in which said sets of needle bearings are disposed.

7. A construction as in claim 5, comprising outer races disposed in the ends of the bushings and in which said sets of needle bearings are disposed, the outer races, at the outer ends of the bushings, being cup shaped to engage over the outer ends of the spindles, and caps pressed into the outer ends of the bushings for holding said cup shaped outer races in position.

WILLIAM L. JONES.